United States Patent
Yamamoto et al.

(10) Patent No.: US 11,550,797 B2
(45) Date of Patent: Jan. 10, 2023

(54) INFORMATION PROCESSING SYSTEM AND NON-TRANSITORY COMPUTER READABLE MEDIUM

(71) Applicant: FUJIFILM BUSINESS INNOVATION CORP., Tokyo (JP)

(72) Inventors: Masakazu Yamamoto, Kanagawa (JP); Kohei Tanaka, Kanagawa (JP)

(73) Assignee: FUJIFILM Business Innovation Corp., Tokyo (JP)

(*) Notice: Subject to any disclaimer, the term of this patent is extended or adjusted under 35 U.S.C. 154(b) by 217 days.

(21) Appl. No.: 16/821,628

(22) Filed: Mar. 17, 2020

(65) Prior Publication Data

US 2020/0380004 A1 Dec. 3, 2020

(30) Foreign Application Priority Data

May 28, 2019 (JP) .............................. JP2019-099459

(51) Int. Cl.
    *G06F 16/20* (2019.01)
    *G06F 16/2457* (2019.01)
    *G09B 7/00* (2006.01)
    *G06F 16/2453* (2019.01)

(52) U.S. Cl.
    CPC .. *G06F 16/24578* (2019.01); *G06F 16/24539* (2019.01); *G06F 16/24575* (2019.01); *G09B 7/00* (2013.01)

(58) Field of Classification Search
    None
    See application file for complete search history.

(56) References Cited

U.S. PATENT DOCUMENTS

| | | | | |
|---|---|---|---|---|
| 8,738,365 | B2* | 5/2014 | Ferrucci | G06F 16/24564 704/9 |
| 9,652,528 | B2* | 5/2017 | Allen | G06F 16/3349 |
| 10,162,897 | B2 | 12/2018 | Kang et al. | |
| 2008/0046317 | A1 | 2/2008 | Christianson et al. | |
| 2015/0026169 | A1* | 1/2015 | Brown | G06F 16/24578 707/723 |
| 2015/0371137 | A1* | 12/2015 | Giffels | G06F 16/3329 706/46 |
| 2016/0078355 | A1* | 3/2016 | Clark | G06F 16/24578 706/52 |

FOREIGN PATENT DOCUMENTS

| | | |
|---|---|---|
| JP | 2012-203756 A | 10/2012 |
| JP | 2013-16136 A | 1/2013 |
| JP | 2014-132475 A | 7/2014 |
| JP | 2015-109065 A | 6/2015 |
| JP | 2018-13909 A | 1/2018 |

* cited by examiner

*Primary Examiner* — Belix M Ortiz Ditren
(74) *Attorney, Agent, or Firm* — Oliff PLC

(57) ABSTRACT

An information processing system comprising a processor programmed to: receive a question asked by a questioner, an answer provided by an answerer to the question, and a rating by a rater with respect to at least one of the question and the answer; manage relationship information, the relationship information being related to the questioner, the answerer, and the rating by the rater; acquire attribute information about each of the questioner, the answerer, and the rater; and present rating information based on the relationship information and in response to a condition specified by a requester with respect to the attribute information.

3 Claims, 25 Drawing Sheets

FIG. 3

| 210 | | | | | | | | |
|---|---|---|---|---|---|---|---|---|
| USERNAME | USER ID | PASSWORD | GROUP NAME | GROUP TYPE | DIVISION NAME | DIVISION TYPE | ROLE | GENDER | AGE |
| A | A001 | **** | aaa CORP. | OFFICE EQUIPMENT MANUFACTURER | RESEARCH & DEVELOPMENT GROUP | DEVELOPMENT | STAFF | WOMAN | 20s |
| B | B002 | **** | aaa CORP. | OFFICE EQUIPMENT MANUFACTURER | RESEARCH & DEVELOPMENT GROUP | DEVELOPMENT | STAFF | MAN | 40s |
| C | C003 | **** | aaa CORP. | OFFICE EQUIPMENT MANUFACTURER | MANUFACTURING GROUP | MANUFACTURING | STAFF | MAN | 30s |
| D | D004 | **** | aaa CORP. | OFFICE EQUIPMENT MANUFACTURER | SALES GROUP | SALES | STAFF | MAN | 40s |
| E | E005 | **** | aaa CORP. | OFFICE EQUIPMENT MANUFACTURER | MANUFACTURING GROUP | MANUFACTURING | STAFF | WOMAN | 30s |
| F | F006 | **** | aaa CORP. | OFFICE EQUIPMENT MANUFACTURER | PERSONNEL GROUP | PERSONNEL | DIRECTOR | MAN | 50s |
| G | G007 | **** | bbb INC. | OFFICE EQUIPMENT MANUFACTURER | RESEARCH & DEVELOPMENT CENTER | DEVELOPMENT | STAFF | WOMAN | 40s |
| H | H008 | **** | bbb INC. | OFFICE EQUIPMENT MANUFACTURER | SALES GROUP | SALES | STAFF | WOMAN | 30s |
| I | I009 | **** | ccc FACTORY | MATERIALS MANUFACTURER | MANUFACTURING GROUP | MANUFACTURING | STAFF | MAN | 50s |
| J | J010 | **** | ccc FACTORY | MATERIALS MANUFACTURER | MANUFACTURING GROUP | MANUFACTURING | STAFF | WOMAN | 30s |
| K | K011 | **** | ddd LAB | PARTS MANUFACTURER | DEVELOPMENT GROUP | DEVELOPMENT | STAFF | WOMAN | 40s |
| L | L012 | **** | ddd LAB | PARTS MANUFACTURER | MANUFACTURING GROUP | MANUFACTURING | STAFF | MAN | 30s |
| M | M013 | **** | eee CO. LTD. | SOFTWARE DEVELOPER | DEVELOPMENT GROUP | DEVELOPMENT | — | MAN | 20s |
| N | N014 | **** | fff GROUP | SOFTWARE DEVELOPER | DEVELOPMENT GROUP | DEVELOPMENT | — | WOMAN | 30s |
| O | O015 | **** | ggg UNIVERSITY | UNIVERSITY | DEPARTMENT OF SCIENCE | DEPARTMENT OF SCIENCE | STUDENT | WOMAN | 20s |
| P | P016 | **** | UNAFFILIATED | — | — | — | — | MAN | 20s |
| ... | ... | ... | ... | ... | ... | ... | ... | ... | ... |

| QUESTION ID | USER ID OF QUESTIONER | QUESTION CONTENT |
|---|---|---|
| Q1 | A001 | TO MAKE THE XXX OPERATION SMOOTHER, ... |
| Q2 | C003 | ... |
| Q3 | F006 | ... |
| Q4 | I009 | ... |
| Q5 | G007 | ... |
| ... | ... | ... |

| ANSWER ID | USER ID OF ANSWERER | ANSWER CONTENT |
|---|---|---|
| Q1A1 | B002 | ..., HOW ABOUT YYY? |
| Q1A2 | C003 | PREVIOUSLY, I ALSO... |
| Q2A1 | E005 | ... |
| Q3A1 | B002 | ... |
| Q4A1 | G007 | ... |
| ... | ... | ... |

RELATIONSHIP INFORMATION

| ANSWER ID | RATING 1 ||| RATING 2 |||| RATING 3 |||||
|---|---|---|---|---|---|---|---|---|---|---|---|
| | RATING RECIPIENT: USER ID | RATER: USER ID | SCORE | COMMENT | RATING RECIPIENT: USER ID | RATER: USER ID | SCORE | COMMENT | RATING RECIPIENT: USER ID | RATER: USER ID | SCORE | COMMENT |
| Q1A1 | QUESTIONER: A001 | ANSWERER: B002 | 8 | ... | ANSWERER: B002 | QUESTIONER: A001 | 5 | ... | QUESTIONER: A001 | VIEWER: C003 | 7 | ... |
| Q1A2 | QUESTIONER: A001 | ANSWERER: C003 | 9 | ... | ANSWERER: C003 | QUESTIONER: A001 | 9 | ... | ANSWERER: C003 | VIEWER: E005 | 8 | ... |
| Q2A1 | QUESTIONER: F006 | ANSWERER: C003 | 5 | ... | ANSWERER: C003 | QUESTIONER: F006 | 5 | ... | QUESTIONER: F006 | VIEWER: J010 | 3 | ... |
| ... | ... | ... | ... | ... | ... | ... | ... | ... | ... | ... | ... | ... |

RELATIONSHIP INFORMATION

| RATING 4 |||| RATING 5 ||||
|---|---|---|---|---|---|---|---|
| RATING RECIPIENT: USER ID | RATER: USER ID | SCORE | COMMENT | RATING RECIPIENT: USER ID | RATER: USER ID | SCORE | COMMENT |
| ANSWERER: B002 | VIEWER: D004 | 4 | ... | VIEWER: D004 | VIEWER: E005 | 5 | ... |
| ANSWERER: C003 | VIEWER: G007 | 7 | ... | QUESTIONER: A001 | VIEWER: E005 | 8 | ... |
| ANSWERER: C003 | VIEWER: M013 | 8 | ... | — | — | — | — |
| ... | ... | ... | ... | ... | ... | ... | ... |

FIG. 7A

31                                        LOGIN USER: A

ASK A QUESTION

QUESTION 1

QUESTIONER: DEVELOPMENT A
   TO MAKE THE XXX OPERATION SMOOTHER, ............
   IS THERE A GOOD MATERIAL FOR THIS?

[SEND]

32                                        LOGIN USER: X

QUESTION

QUESTIONER: DEVELOPMENT A               2019-XX-XX 10:15
   QUESTION 1: TO MAKE THE XXX OPERATION SMOOTHER, ............
   IS THERE A GOOD MATERIAL FOR THIS?

321
325

QUESTION RATING (AVERAGE): --
(SEE RATING DETAILS)

324

[ANSWER QUESTION 1]
[RATE QUESTION 1]

CURRENTLY, THERE ARE NO ANSWERS TO THIS QUESTION.

33 LOGIN USER: C

ANSWER TO QUESTION 1

[QUESTION CONTENT]  2019-XX-XX 10:15

331 → TO MAKE THE XXX OPERATION SMOOTHER, ... ... ... ...
IS THERE A GOOD MATERIAL FOR THIS?

ANSWER

> ANSWERER: DEVELOPMENT C
> PREVIOUSLY, I ALSO TRIED ZZZ, BUT IF ... USE ... FOR THE MATERIAL, ...
> MAKE THE STRUCTURE OF THE BEARING INTO XXX, OPERATION IS
> QUIET AND YOU CAN KEEP COSTS DOWN.
> GIVE IT A TRY.

[SEND]

34 LOGIN USER: B

RATE QUESTION 1

[QUESTION CONTENT]  2019-XX-XX 10:15

341 → TO MAKE THE XXX OPERATION SMOOTHER, ... ... ... ...
IS THERE A GOOD MATERIAL FOR THIS?

RATING COMMENT

> ANSWERER: DEVELOPMENT B
> ...

343

RATE QUESTION 1:

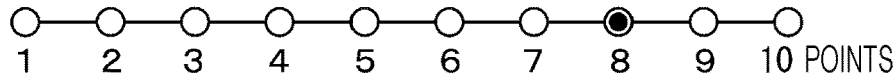

1  2  3  4  5  6  7  8  9  10 POINTS

[SEND]

342   344

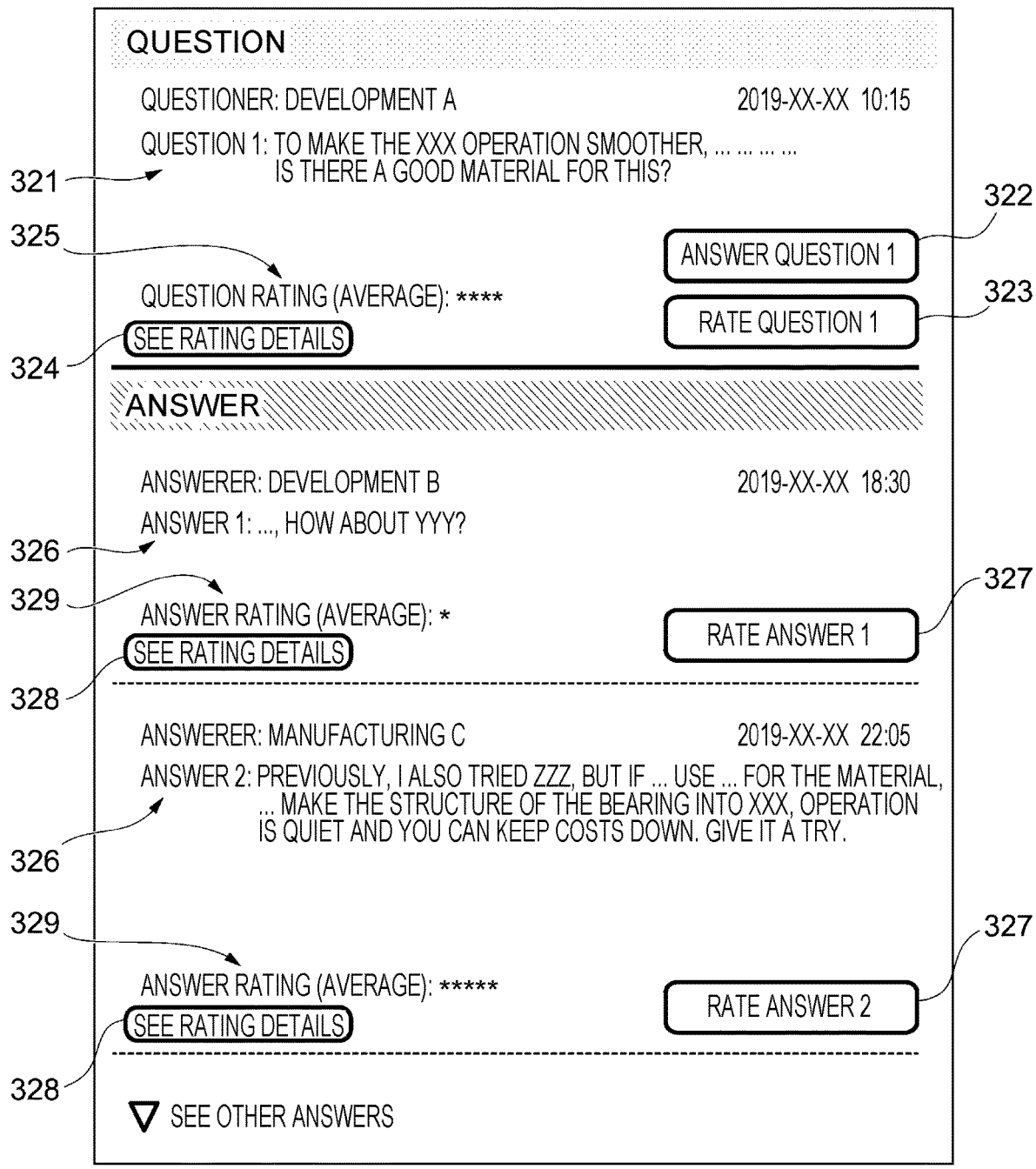

FIG. 11

36 — LOGIN USER: D

RATE ANSWER 2

[QUESTION CONTENT]  2019-XX-XX 10:15
TO MAKE THE XXX OPERATION SMOOTHER, ... ... ... IS THERE A GOOD MATERIAL FOR THIS?

361

[ANSWER CONTENT]  2019-XX-XX 18:30
PREVIOUSLY, I ALSO TRIED ZZZ, BUT IF ... USE ... FOR THE MATERIAL, ... MAKE THE STRUCTURE OF THE BEARING INTO XXX, OPERATION IS QUIET AND YOU CAN KEEP COSTS DOWN.
GIVE IT A TRY.

362

RATING COMMENT

RATER: DEVELOPMENT D
I THINK THIS IS GREAT FOR THE FOCUS ON LOWERING NOISE.

363

RATE ANSWER 2
○—○—○—○—○—○—○—○—●—○
1   2   3   4   5   6   7   8   9   10 POINTS

364

SEND

LOGIN USER: F

ANSWER 2 RATING DETAILS

[QUESTION CONTENT]     2019-XX-XX 10:15

371 → TO MAKE THE XXX OPERATION SMOOTHER, ............ IS THERE A GOOD MATERIAL FOR THIS?

[ANSWER CONTENT]     2019-XX-XX 18:30

372 → PREVIOUSLY, I ALSO TRIED ZZZ, BUT IF ... USE ... FOR THE MATERIAL, ... MAKE THE STRUCTURE OF THE BEARING INTO XXX, OPERATION IS QUIET AND YOU CAN KEEP COSTS DOWN.
GIVE IT A TRY.

---

RATING 1     2019-XX-XX 20:40

[RATING COMMENT]

373 → I THINK THIS IS GREAT FOR THE FOCUS ON LOWERING NOISE.

[ RATE RATING 1 ] ← 374

FIG. 13

38 — LOGIN USER: E

RATE RATING FOR ANSWER 2

381 — [QUESTION CONTENT]   2019-XX-XX 10:15
TO MAKE THE XXX OPERATION SMOOTHER, ... ... ... ... IS THERE A GOOD MATERIAL FOR THIS?

382 — [ANSWER CONTENT]   2019-XX-XX 18:30
PREVIOUSLY, I ALSO TRIED ZZZ, BUT IF ... USE ... FOR THE MATERIAL, ... MAKE THE STRUCTURE OF THE BEARING INTO XXX, OPERATION IS QUIET AND YOU CAN KEEP COSTS DOWN.
GIVE IT A TRY.

383 — [RATING CONTENT]   2019-XX-XX 20:40
I THINK THIS IS GREAT FOR
THE FOCUS ON LOWERING NOISE.

---

RATING COMMENT

384 —
POSTER: MANUFACTURING E
I THINK SUPPORTING THE PERSPECTIVE ON LOW NOISE IS GOOD.

RATE THE RATING FOR ANSWER 2

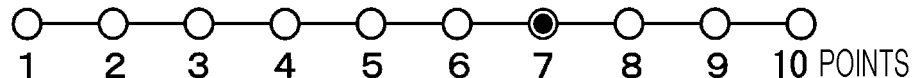

1  2  3  4  5  6  7  8  9  10 POINTS

385

386 — SEND

FIG. 14

39    LOGIN USER: F

391 → SPECIFY CONDITIONS ON RATING INFORMATION

[RATING RECIPIENT ATTRIBUTE INFORMATION]

| QUESTIONER ▽ | GROUP NAME ▽ | aaa CORP. |

LINE CONDITION [or ▽]

| ANSWERER ▽ | GROUP NAME ▽ | aaa CORP. |

LINE CONDITION [or ▽]

| RATER ▽ | GROUP NAME ▽ | aaa CORP. |

LINE CONDITION [and ▽]

[ADD LINE]

392 →

[RATER ATTRIBUTES]

| — ▽ | DIVISION ▽ | SAME AS RATING RECIPIENT |

LINE CONDITION [or ▽]

| — ▽ | DIVISION ▽ | DIFFERENT FROM RATING RECIPIENT |

LINE CONDITION [and ▽]

[ADD LINE]

393 →

[RATING INFORMATION DISPLAY OPTION]

[SORT BY HIGHEST RATING ▽]

394

[CREATE RATING INFORMATION]

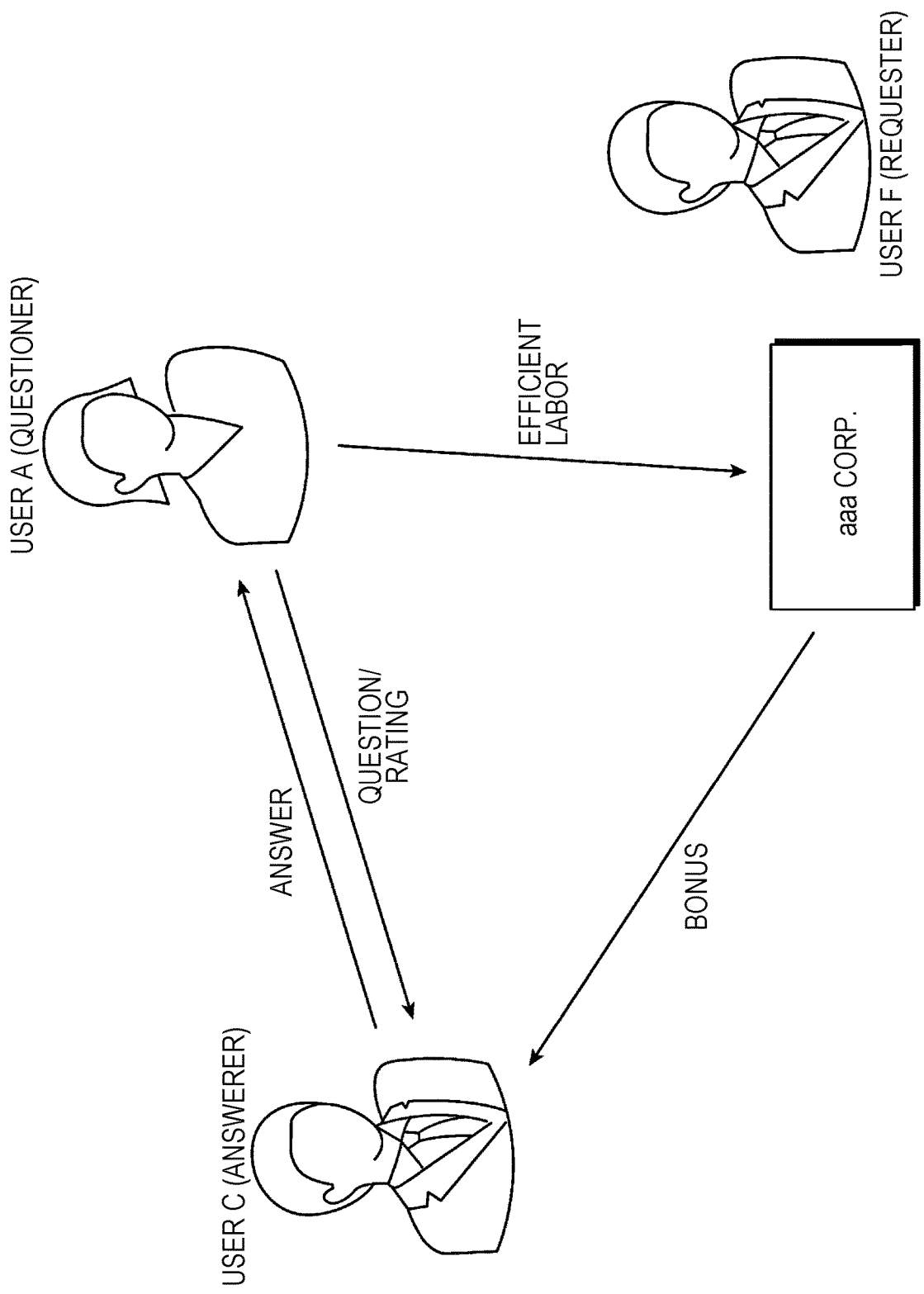

FIG. 16

| GROUP NAME OF RATING RECIPIENT | USERNAME OF RATING RECIPIENT | RATING AS QUESTIONER | | RATING AS ANSWERER | | RATING AS RATER | |
|---|---|---|---|---|---|---|---|
| aaa CORP. | A | RATER: SAME DIVISION | 8 | RATER: SAME DIVISION | 3 | RATER: SAME DIVISION | 4 |
| | | RATER: DIFFERENT DIVISION | 7 | RATER: DIFFERENT DIVISION | 4 | RATER: DIFFERENT DIVISION | 3 |
| aaa CORP. | B | RATER: SAME DIVISION | 5 | RATER: SAME DIVISION | 5 | RATER: SAME DIVISION | 5 |
| | | RATER: DIFFERENT DIVISION | 4 | RATER: DIFFERENT DIVISION | 3 | RATER: DIFFERENT DIVISION | 5 |
| aaa CORP. | C | RATER: SAME DIVISION | 8 | RATER: SAME DIVISION | 9 | RATER: SAME DIVISION | 8 |
| | | RATER: DIFFERENT DIVISION | 7 | RATER: DIFFERENT DIVISION | 9 | RATER: DIFFERENT DIVISION | 8 |
| aaa CORP. | D | RATER: SAME DIVISION | 4 | RATER: SAME DIVISION | 3 | RATER: SAME DIVISION | 9 |
| | | RATER: DIFFERENT DIVISION | 5 | RATER: DIFFERENT DIVISION | 5 | RATER: DIFFERENT DIVISION | 9 |
| aaa CORP. | E | RATER: SAME DIVISION | 2 | RATER: SAME DIVISION | 7 | RATER: SAME DIVISION | 8 |
| | | RATER: DIFFERENT DIVISION | 5 | RATER: DIFFERENT DIVISION | 3 | RATER: DIFFERENT DIVISION | 7 |
| aaa CORP. | F | RATER: SAME DIVISION | 0 | RATER: SAME DIVISION | 0 | RATER: SAME DIVISION | 8 |
| | | RATER: DIFFERENT DIVISION | 0 | RATER: DIFFERENT DIVISION | 0 | RATER: DIFFERENT DIVISION | 9 |

FIG. 18

| GROUP NAME OF QUESTIONER | GROUP NAME OF ANSWERER | ANSWER ID | USERNAME OF RATER | GROUP NAME OF RATER | RATING FOR QUESTION | RATING FOR ANSWER |
|---|---|---|---|---|---|---|
| aaa CORP. | aaa CORP. | Q4A1 | G | bbb INC. | 6 | 5 |
| aaa CORP. | aaa CORP. | Q4A2 | I | ccc FACTORY | 8 | 9 |
| aaa CORP. | aaa CORP. | Q7A1 | L | ddd LAB | 5 | 3 |
| aaa CORP. | aaa CORP. | Q8A1 | P | UNAFFILIATED | 9 | 7 |
| ⋮ | ⋮ | ⋮ | ⋮ | ⋮ | ⋮ | ⋮ |

FIG. 20

| ANSWERER | ANSWER ID | GROUP NAME OF RATER | GROUP TYPE OF RATER | RATING FOR ANSWER |
|---|---|---|---|---|
| A | Q8A1 | bbb INC. | OFFICE EQUIPMENT MANUFACTURER | 3 |
| A | Q15A2 | ccc FACTORY | MATERIALS MANUFACTURER | 5 |
| A | Q21A1 | ddd LAB | PARTS MANUFACTURER | 6 |
| A | Q23A1 | fff GROUP | SOFTWARE DEVELOPER | 9 |
| ⋮ | ⋮ | ⋮ | ⋮ | ⋮ |

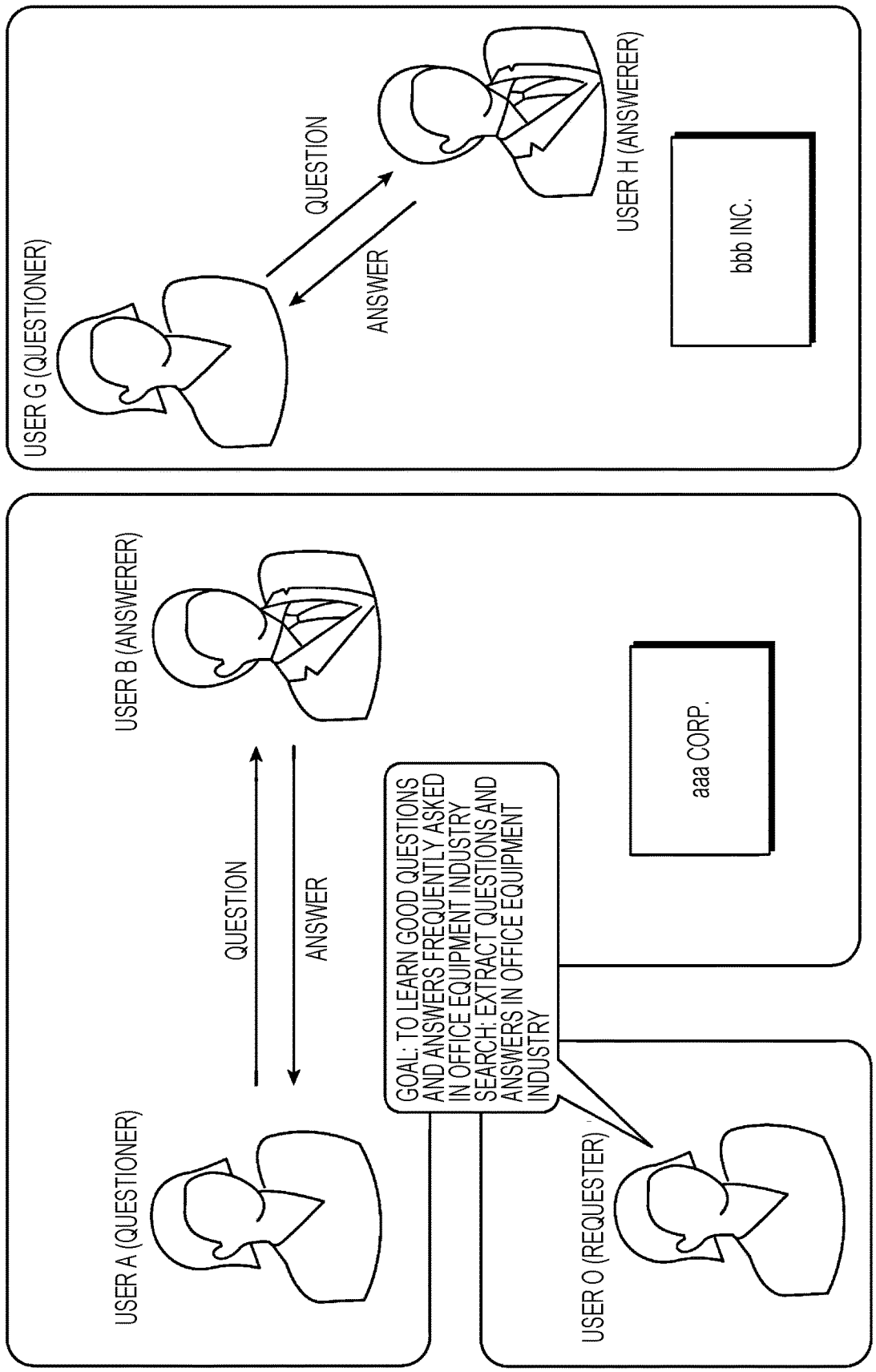

FIG. 22

| GROUP TYPE OF QUESTIONER | GROUP TYPE OF ANSWERER | GROUP NAME OF QUESTIONER | GROUP NAME OF ANSWERER | ANSWER ID | QUESTION CONTENT | ANSWER CONTENT | RATING FOR QUESTION | RATING FOR ANSWER |
|---|---|---|---|---|---|---|---|---|
| OFFICE EQUIPMENT MANUFACTURER | OFFICE EQUIPMENT MANUFACTURER | aaa CORP. | aaa CORP. | Q16A1 | ... | ... | 10 | 10 |
| OFFICE EQUIPMENT MANUFACTURER | OFFICE EQUIPMENT MANUFACTURER | aaa CORP. | aaa CORP. | Q39A1 | ... | ... | 10 | 9 |
| OFFICE EQUIPMENT MANUFACTURER | OFFICE EQUIPMENT MANUFACTURER | bbb INC. | bbb INC. | Q22A1 | ... | ... | 9 | 10 |
| OFFICE EQUIPMENT MANUFACTURER | OFFICE EQUIPMENT MANUFACTURER | bbb INC. | aaa CORP. | Q25A2 | ... | ... | 8 | 9 |
| OFFICE EQUIPMENT MANUFACTURER | OFFICE EQUIPMENT MANUFACTURER | aaa CORP. | bbb INC. | Q22A1 | ... | ... | 8 | 9 |
| ... | ... | ... | ... | ... | ... | ... | ... | ... |

FIG. 24

| GROUP NAME | ANSWER ID | ANSWERER | RATING FOR ANSWER | ANSWER CONTENT |
|---|---|---|---|---|
| aaa CORP. | Q9A1 | USER C | 10 | ... |
| aaa CORP. | Q23A2 | USER C | 9 | ... |
| aaa CORP. | Q43A1 | USER C | 9 | ... |
| aaa CORP. | Q17A1 | USER B | 6 | ... |
| aaa CORP. | Q22A1 | USER D | 5 | ... |
| aaa CORP. | Q25A2 | USER A | 4 | ... |
| ... | ... | ... | ... | ... | under 35

INFORMATION PROCESSING SYSTEM AND NON-TRANSITORY COMPUTER READABLE MEDIUM

CROSS-REFERENCE TO RELATED APPLICATIONS

This application is based on and claims priority under 35 USC 119 from Japanese Patent Application No. 2019-099459 filed May 28, 2019.

BACKGROUND

(i) Technical Field

The present disclosure relates to an information processing system and a non-transitory computer readable medium.

(ii) Related Art

For example, Japanese Unexamined Patent Application Publication No. 2015-109065 discloses a knowledge-sharing service providing system utilizing information about relationships among users on an SNS. The knowledge-sharing service providing system includes: a question data management unit that saves question data when the question data is transmitted from a user terminal device of a first user, and saves a question sharing request in association the question data when the question sharing request regarding the question data is transmitted from a user terminal device of a second user; and a question data provision unit that, on the basis of information about relationships among users, provides the question data associated with the question sharing request to a user terminal device of a third user having an acquaintance relationship with the second user.

SUMMARY

In some cases, it is desirable to give people-related ratings for purposes such as evaluating personnel or finding human resources in an organization such as a business, for example. Meanwhile, the exchange of questions and answers is one form of human communication. Furthermore, it is conceivably possible to give people-related ratings on the basis of the activities of asking questions, providing answers, and additionally rating questions and answers. However, questions and answers are exchanged verbally, in email, or the like between the persons involved, and furthermore, ratings with respect to the questions and answers are given only by the persons involved. For this reason, in the past, the relationships among the activities of questioning, answering, and rating have not been recognized objectively.

Aspects of non-limiting embodiments of the present disclosure relate to recognizing relationships among the activities of questioning, answering, and rating.

Aspects of certain non-limiting embodiments of the present disclosure address the features discussed above and/or other features not described above. However, aspects of the non-limiting embodiments are not required to address the above features, and aspects of the non-limiting embodiments of the present disclosure may not address features described above.

According to an aspect of the present disclosure, there is provided an information processing system comprising a processor programmed to: receive a question asked by a questioner, an answer provided by an answerer to the question, and a rating by a rater with respect to at least one of the question and the answer; manage relationship information, the relationship information being related to the questioner, the answerer, and the rating by the rater; acquire attribute information about each of the questioner, the answerer, and the rater; and present rating information based on the relationship information and in response to a condition specified by a requester with respect to the attribute information.

BRIEF DESCRIPTION OF THE DRAWINGS

An exemplary embodiment of the present disclosure will be described in detail based on the following figure, wherein:

FIG. 3 is one example of a user management table managed by a user management unit;

FIGS. 4A and 4B are one example of a question management table and an answer management table according to the exemplary embodiment;

FIG. 5 is one example of rating relationship information according to the exemplary embodiment;

FIG. 7A is a question reception image that receives a question from a questioner, while FIG. 7B is a question-and-answer image in which a posted question and an answer to the question are displayed;

FIG. 8A is an answer reception image for providing an answer to a question, while FIG. 8B is a question rating image for rating a question;

FIG. 9 is a question-and-answer image in which a posted question and any answers to the question are displayed;

FIG. 11 is an answer rating image for rating an answer;

FIG. 12 is a rating details image by which a viewer checks a rating of an answer;

FIG. 13 is a metarating image for rating a rating of an answer;

FIG. 14 is a rating request image by which a requester requests rating information;

FIG. 15 is an overview of a usage scenario of Specific Example 1;

FIG. 16 is one example of rating information presented by an information presentation unit in Specific Example 1;

FIG. 18 is one example of rating information presented by the information presentation unit in Specific Example 2;

FIG. 20 is one example of rating information presented by the information presentation unit in Specific Example 3;

FIG. 21 is an overview of a usage scenario of Specific Example 4;

FIG. 22 is one example of rating information presented by the information presentation unit in Specific Example 4;

FIG. 24 is one example of rating information presented by the information presentation unit in Specific Example 5.

DETAILED DESCRIPTION

Hereinafter, an exemplary embodiment of the present disclosure will be described in detail and with reference to the attached drawings.

<Overall Configuration of Information Processing System 1>

Figure 1:
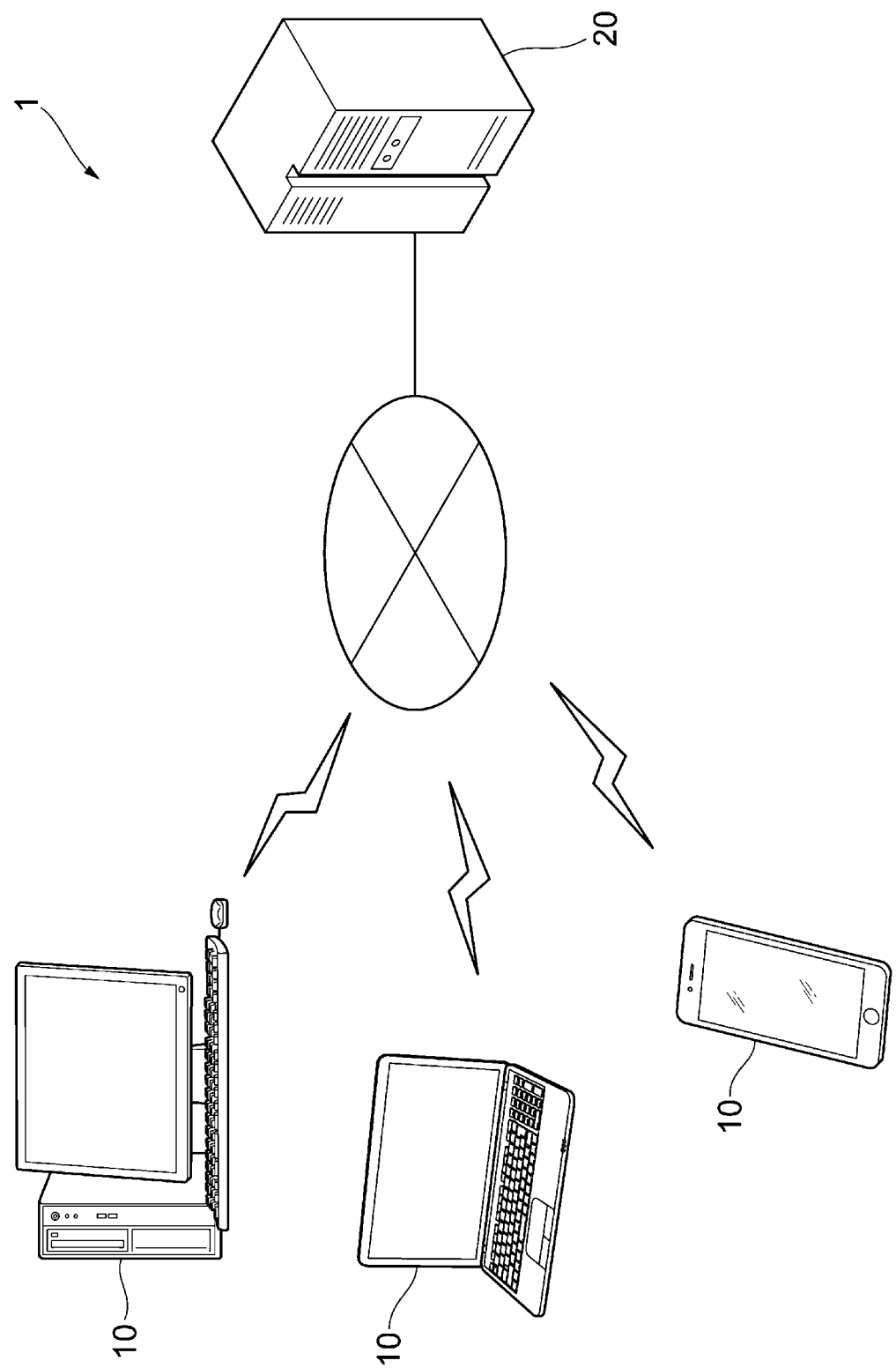
FIG. 1 is a diagram illustrating an overall configuration of an information processing system according to the exemplary embodiment.

FIG. 1 is a diagram illustrating an overall configuration of an information processing system 1 according to the exemplary embodiment.

The information processing system 1 according to the exemplary embodiment is provided with multiple terminal devices 10 and a server device 20 that provides an activity rating service. Additionally, the multiple terminal devices 10 and the server device 20 are capable of bidirectional data communication with each other over a network.

Note that in the information processing system 1 according to the exemplary embodiment, the individual devices are capable of communicating information with each other over the network. The network is not particularly limited insofar as the network is a communication network used to communicate data among devices, and may be for example a local area network (LAN), a wide area network (WAN), the Internet, or the like. The communication channel used for data communication may be wired, wireless, or a combination of the two. Also, each device may use a relay device such as a gateway device or a router to connect through multiple networks and communication channels.

For the terminal devices 10, a stationary terminal device, such as a personal computer, or a mobile information terminal, such as a tablet or a smartphone, may be used. Also, although FIG. 1 illustrates three terminal devices 10 as the multiple terminal devices 10 as an example, four or more terminal devices 10 may also be connected. The following description assumes that multiple users who use the system according to the exemplary embodiment respectively use one of the terminal devices 10 that each user possesses. Also, the terminal devices respectively possessed by each of the users will be collectively referred to as the "terminal device(s) 10" when not being individually distinguished from each other.

Herein, one example of an activity rating service provided by the information processing system 1 according to the exemplary embodiment will be described. In the information processing system 1 according to the exemplary embodiment, a question is posted by a certain user, and another user provides an answer to the posted question. Additionally, in the information processing system 1, questions and answers are rated by users. Furthermore, in the information processing system 1, a rating may be further rated by a user in some cases.

Note that in the exemplary embodiment, a user who asks a question is called a "questioner", while a user who provides an answer is called an "answerer". Also, a user who views questions and answers without asking a question or providing an answer is called a "viewer". Furthermore, a user who rates a question or an answer is called a "rater". In the exemplary embodiment, the rater may be a questioner, an answerer, or a viewer, depending on the circumstances. Also, a user who is rated is called a "rating recipient". In the exemplary embodiment, the rating recipient may be a questioner, an answerer, or a viewer, depending on the circumstances.

In addition, in the information processing system 1 according to the exemplary embodiment, for a single exchange of an answer in response to a question (hereinafter referred to as a question-and-answer pair), relationship information is created. The relationship information is related to the ratings of the questioner who asked the question, the answerer who provided the answer, and the rater who gives a rating. The relationship information is accumulated as question-and-answer pairs are formed and ratings are given. Additionally, in the information processing system 1 according to the exemplary embodiment, rating information specified from the relationship information on the basis of conditions on user attribute information specified by a requester is presented to the requester. By examining the content of the rating information, the requester is able to visually recognize the rating of each person from the individual ratings with respect to the questioner, the answerer, and the rater. Note that the role of requester is carried out by a user who is any of a questioner, an answerer, a rater, and a viewer. Hereinafter, the above content will be described in detail.

Figure 2:
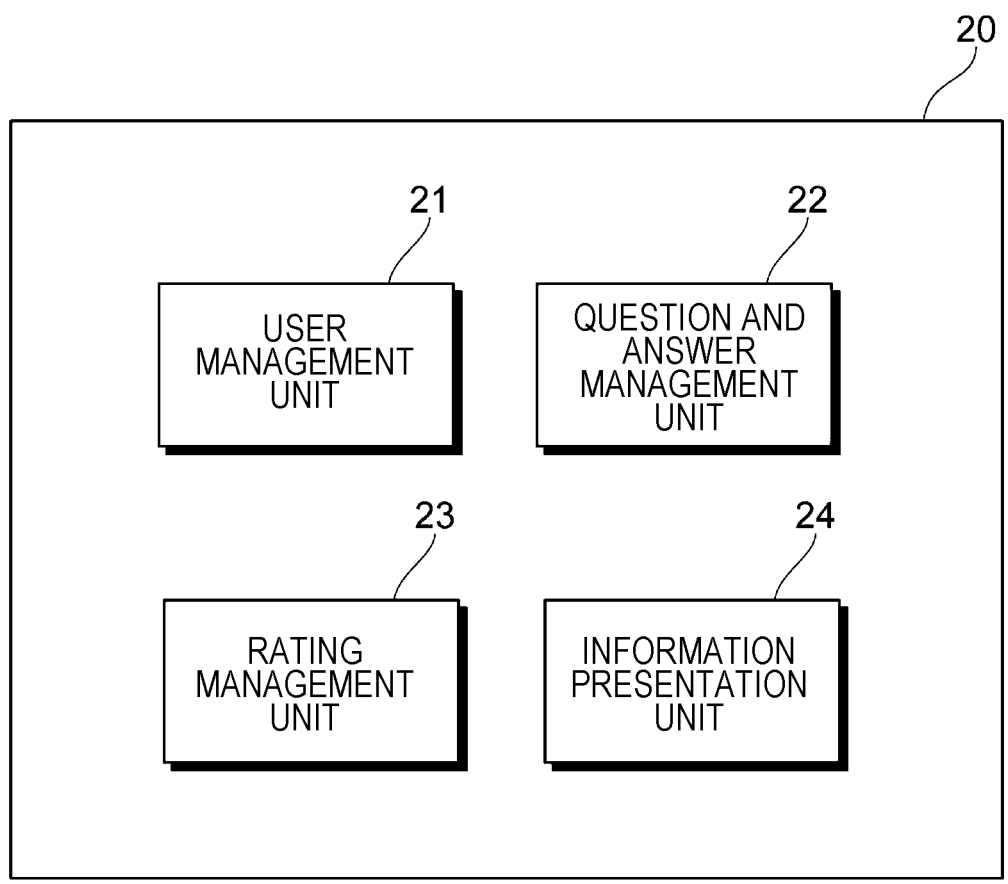
FIG. 2 is a function block diagram of a server device according to the exemplary embodiment.

FIG. 2 is a function block diagram of the server device 20 according to the exemplary embodiment. The server device 20 is provided with a user management unit 21 that manages user information, a question and answer management unit 22 that manages questions and answers, a rating management unit 23 that manages ratings with respect to questions, answers, and ratings, and an information presentation unit 24 that presents rating information in response to a request by a requester.

(User Management Unit 21)

FIG. 3 is one example of a user management table 210 managed by the user management unit 21. The user management unit 21 uses the user management table 210 to manage user information about multiple users who use the system. In the user management table 210, a username, a user ID, a password, and user attribute information are managed as user information. In the exemplary embodiment, the user attribute information includes information about a group name, a group type, a division name, a division type, a role, gender, and age. Note that this user attribute information is merely one example. The user attribute information is information related to the properties and features of each user, and may also include other information, such as information about the user's capabilities and social relationships, for example.

The user ID and the password are what is typically called user account information. The user ID and the password are used when a user who uses the system logs in to the system. Also, in the exemplary embodiment, by logging in, a user who uses the system becomes able to post questions, post answers, view questions and answers, and give various ratings. Consequently, in this system, it is understood which users have performed which activities, such as questioning, answering, and rating.

The group name is information indicating the name of a group to which the user belongs, such as the name of a business, a university, a public institution, or a corporation, for example. The group type is information indicating the type of group to which the user belongs. Information about types of industries, such as the manufacturing industry, the telecommunications industry, the service industry, the construction industry, and academic research, is used. The division name is information indicating the name of a further category within the group, such as a division, to which the user belongs. The division type is information indicating the type of division to which the user belongs. In the case of a business, for example, names such as personnel, accounting, sales, development, manufacturing, and administration are used as division types. Also, in the case of a university or the like, names such as department of law, department of economics, department of science, and department of engineering are used as division types.

(Question and Answer Management Unit 22)

FIGS. 4A and 4B are one example of a question management table and an answer management table according to the exemplary embodiment. The question and answer management unit 22 (one example of a reception unit) receives questions from questioners and also receives answers from answerers. Additionally, the question and answer management unit 22 manages the questions received from questioners and the answers received from answerers. The question and answer management unit 22 according to the exemplary embodiment uses a question management table 221 to manage questions asked by questioners. Also, the question and answer management unit 22 according to the exemplary embodiment uses an answer management table 222 to manage answers provided by answerers.

The question and answer management unit 22 receives a question from a questioner through a screen on the terminal device 10 used by a questioner. Subsequently, the question and answer management unit 22 assigns, to the received question content, a question ID that makes it possible to uniquely specify the question. As illustrated in FIG. 4A, in the question management table 221, the user ID of the questioner and the question content are associated with each question ID. In this way, the question and answer management unit 22 uses the question management table 221 to manage the question ID, the user ID of the questioner, and the question content in association with each other.

Also, the question and answer management unit 22 receives an answer to a question from an answerer through a screen on the terminal device 10 used by an answerer. Subsequently, the question and answer management unit 22 assigns, to the received answer content, an answer ID that makes it possible to uniquely specify the answer. As illustrated in FIG. 4B, in the answer management table 222, the user ID of the answerer and the answer content are associated with each answer ID. In the case where there are multiple answers in response to a single question, the question and answer management unit 22 creates an answer ID for each question-and-answer pair. Additionally, the question and answer management unit 22 uses the answer management table 222 to manage the answer ID, the user ID of the answerer, and the answer content in association with each other.

(Rating Management Unit 23)

The rating management unit 23 (one example of a relationship management unit and one example of an adjustment unit) receives each of ratings for questions, ratings for answers, and ratings for ratings. The rating management unit 23 according to the exemplary embodiment receives a score and a rating comment from a rater. In one rating, the rating management unit 23 according to the exemplary embodiment receives a score on a 10-point scale from 1 (lowest) to 10 (highest) from a rater. Also, in the exemplary embodiment, it is possible to receive respective ratings for questions, answers, and ratings from multiple raters rather than from only a single rater. Additionally, the rating management unit 23 according to the exemplary embodiment treats an average value obtained by averaging the scores received from multiple raters as the rating in some cases. Also, the rating management unit 23 according to the exemplary embodiment treats a total value obtained by totaling the scores received from multiple raters as the rating in some cases. Note that in the exemplary embodiment, ratings for questions and answers are handled as ratings with respect to the questioner who asked the question and the answerer who provided the answer, respectively.

FIG. 5 is one example of rating relationship information 230 according to the exemplary embodiment. As illustrated in FIG. 5, the rating management unit 23 manages each of the ratings with the rating relationship information 230. In the rating relationship information 230, the user ID of the rating recipient, the user ID of the rater, a score, and a comment are associated with each answer ID, or in other words, with each question-and-answer pair. In the case where multiple ratings are given to a single question-and-answer pair, the rating management unit 23 according to the present embodiment creates a rating result according to the given ratings. Subsequently, the rating management unit 23 manages relationship information, namely the rating relationship between the rating recipient, the rater, and the score with the rating relationship information 230. In other words, the rating management unit 23 stores rating relationships indicating which users have rated which other users and with what ratings.

Also, the rating management unit 23 adjusts the content of the rating information according to information about the time when a rating by a rater is received. The rating management unit 23 according to the present embodiment sets a greater weight on rating information with a small increase in the rating value per unit time than the weight on rating information with a large increase in the rating value per unit time. For example, with respect to a certain rating, the rating management unit 23 raises the rating value of a rating that reaches 1000 points in one year for example over a rating whose score reaches 1000 points in one month, for example.

When a predetermined time has elapsed since a question was asked, the rating management unit 23 specifies the increase in the rating value per unit time. Subsequently, on the basis of the increase in the rating value per unit time, the rating management unit 23 adjusts the score by multiplying the rater-given score by a coefficient or the like. This is based on the thinking that ratings given to a rated question, answer, or the like over a relatively long period of time have greater weight than ratings of passing popularity.

Also, the rating management unit 23 sets a greater weight on rating information rated at a specific time than the weight on rating information rated at times before the specific time. For example, the rating management unit 23 raises the rating value of a rating given a year after a question is posted over a rating given a month after the question is posted. In other words, with respect to a certain rating, even in cases where different raters give ratings with the same score at different times, the rating management unit 23 increases the weight on the rating given a relatively longer period of time after the question is posted compared to the rating given a relatively shorter period of time after the question is posted.

When a predetermined time has elapsed since a question was asked, the rating management unit 23 adjusts the score by multiplying the rater-given score by a coefficient or the like, such that ratings given a relatively longer period of time after the question is posted are increased. This is based on the thinking that if a rating is given even after a relatively long period of time has elapsed since a question was posted, the content is still relevant despite the passage of time, and the question or answer is useful and will be referenced for a long time.

(Information Presentation Unit 24)

The information presentation unit 24 uses the relationship information managed by the rating management unit 23 and the user attribute information managed by the user management unit 21 to present rating information according to a condition or conditions specified by a requester who makes a request. The rating information is information related to ratings extracted from the relationship information managed by the rating management unit 23 according to the condition or conditions on the user attribute information specified by the requester. Also, insofar as the user attribute information specified by the requester is information managed in the user management table 210, information corresponding to any condition by the requester may be used. Subsequently, the information presentation unit 24 causes the rating information specified using the rating relationship information 230 and the user management table 210 to be displayed on a screen of the terminal device 10 of the requester. Note that in the exemplary embodiment, the information presentation unit 24 functions as one example of an acquisition unit, one example of a presentation unit, one example of a creation unit, or one example of an attribute reception unit.

Specifically, the rating information may express relationships between the attribute information of the questioner treated as the rating recipient, the attribute information of the rater, and the score, for example. With this arrangement, the requester is able to understand how the questioner is rated by what kind of people. Similarly, the rating information may express relationships between the attribute information of the answerer treated as the rating recipient, the attribute information of the rater, and the score, for example. With this arrangement, the requester is able to understand how the answerer is rated by what kind of people. Also, the rating information may express relationships between the attribute information of the viewer who gave a rating treated as the rating recipient, the attribute information of the rater, and the score, for example. With this arrangement, the requester is able to understand how the viewer who gave a rating is rated by what kind of people.

Additionally, the information presentation unit 24 is capable of presenting the relationship information according to a condition or conditions on the user attribute information specifically specified by the requester. For example, in some cases the requester may want to grasp the rating given to the requester him- or herself. In this case, the information presentation unit 24 presents, to the requester, rating information for cases where the requester him- or herself is the questioner, the answerer, or the rater.

As another example, in some cases the requester may want to grasp the rating given to a questioner, an answerer, or a rater in an organization to which the requester belongs. Note that in the exemplary embodiment, the organization to which the requester belongs may be a group to which the requester belongs or a division to which the requester belongs, for example. Subsequently, the information presentation unit 24 presents, to the requester, rating information about a questioner, an answerer, or a rater in the organization to which the requester belongs.

As a further example, in some cases the requester may want to grasp the rating given to a questioner, an answerer, or a rater in an organization to which the requester does not belong. Note that in the exemplary embodiment, the organization to which the requester does not belong may be a group different from the group of the requester or a division different from the division of the requester, for example. Subsequently, the information presentation unit 24 presents, to the requester, rating information about a questioner, an answerer, or a rater in the organization to which the requester does not belong.

Figure 6:
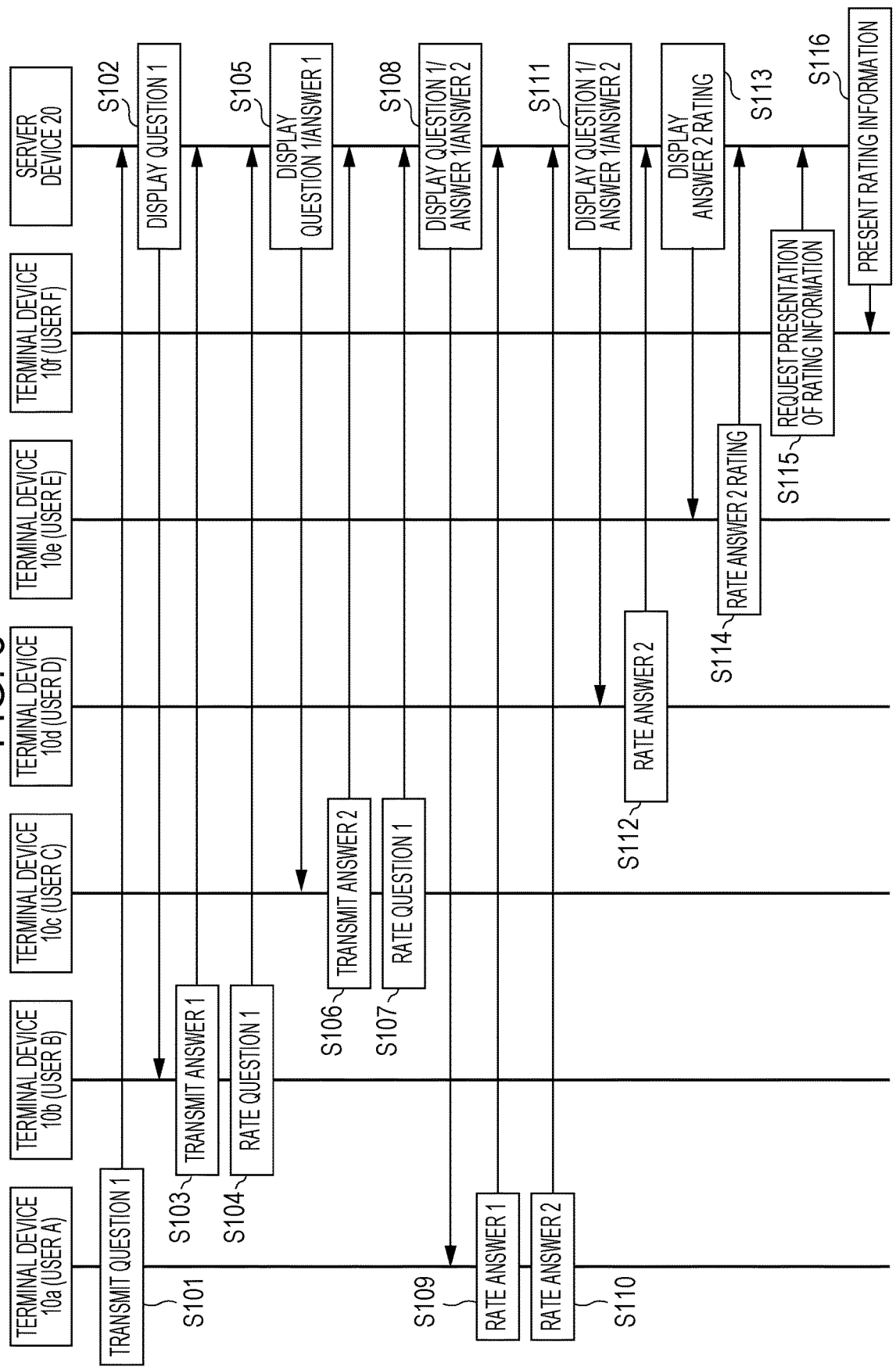
FIG. 6 is a diagram explaining operations of the information processing system according to the exemplary embodiment.

FIG. 6 is a diagram explaining operations of the information processing system 1 according to the exemplary embodiment. In FIG. 6, the flow of information between configuration units in the following example will be described as one example of a description of operations. In this example, a user A who is a questioner posts a question using a terminal device 10a, and users B and C who are answerers provide answers to the question using terminal devices 10b and 10c, respectively. Also, in this example, a user D who is a viewer gives a rating using a terminal device 10d. Furthermore, in this example, a user E who is a viewer rates the rating using a terminal device 10e. Additionally, in this example, a user F who is a requester requests a presentation of rating information using a terminal device 10f.

First, the user A logs in using the terminal device 10a. Subsequently, the terminal device 10a transmits a question 1 asked by the user A to the server device 20 (S101). The question 1 is transmitted together with the user ID of the user A to the server device 20. In the server device 20, the question and answer management unit 22 (see FIG. 2) receives the question 1.

Also, the user B logs in using the terminal device 10b. The server device 20 causes the question 1 asked by the user A to be displayed on the terminal device 10b (S102). Subsequently, the user B provides an answer 1 to the question 1, and also rates the question 1. The terminal device 10b transmits the answer 1 provided by the user B in response to the question 1 to the server device 20 (S103). In the server device 20, the question and answer management unit 22 receives the answer 1. Additionally, the terminal device 10b transmits the rating by the user B with respect to the question 1 to the server device 20 (S104). In the server device 20, the rating management unit 23 (see FIG. 2) receives the rating by the user B.

Similarly, the user C logs in using the terminal device 10c. The server device 20 causes the question 1 asked by the user A and the answer 1 provided by the user B to be displayed on the terminal device 10c (S105). In this example, when the user C logs in, the answer 1 has already been posted by the user B. For this reason, the answer 1 provided by the user B is displayed together with the question 1 asked by the user A on the terminal device 10c of the user C. Subsequently, the user C provides an answer 2 to the question 1, and also rates the question 1. The terminal device 10c transmits the answer 2 provided by the user C in response to the question 1 to the server device 20 (S106). In the server device 20, the question and answer management unit 22 receives the answer 2. Additionally, the terminal device 10c transmits the rating by the user C with respect to the question 1 to the server device 20 (S107). In the server device 20, the rating management unit 23 receives the rating by the user C.

At this point, the user A checks the answers using the terminal device 10a. The server device 20 causes the question 1 by the user A him- or herself, the answer 1 provided by the user B, and the answer 2 provided by the user C to be displayed on the terminal device 10a (S108). Subsequently, the user A rates each of the answer 1 provided by the user B and the answer 2 provided by the user C. The terminal device 10a transmits the rating by the user A with respect to the answer 1 (S109) and the rating by the user A with respect to the answer 2 (S110) to the server device 20. In the server device 20, the question and answer management unit 22 receives the ratings by the user A.

Furthermore, the user D logs in using the terminal device 10d. The server device 20 causes the question 1 asked by the user A, the answer 1 provided by the user B, and the answer 2 provided by the user C to be displayed on the terminal device 10d (S111). Additionally, in this example, the user D rates the answer 2 provided by the user C. The terminal device 10d transmits the rating by the user D with respect to the answer 2 to the server device 20 (S112). In the server device 20, the question and answer management unit 22 receives the rating.

After that, the user E logs in using the terminal device 10e, and in this example, the user E views the rating of the answer 2 as a viewer. The server device 20 causes the rating by the user D with respect to the answer 2 to be displayed on the terminal device 10e (S113). Subsequently, the user E rates the rating by the user D with respect to the answer 2. The terminal device 10e transmits the rating by the user E with respect to the rating of the answer 2 to the server device 20 (S114). In the server device 20, the question and answer management unit 22 receives the rating.

After that, the user F logs in using the terminal device 10f. Subsequently, through the terminal device 10f, the user F requests the presentation of rating information about a user or users belonging to the group to which the user F belongs (in the exemplary embodiment, "aaa Corp."), for example. The terminal device 10f issues a request to the server device 20 for the presentation of rating information according to the conditions on the user attribute information specified by the user F (S115). The server device 20 presents, to the user F, rating information specified from the relationship information in the rating relationship information 230 and the attribute information in the user management table 210 (S116).

Next, specific examples of images displayed on the screens of the terminal devices 10 used by each user will be described while referencing FIGS. 7A to 14.

FIG. 7A is a question reception image 31 for receiving a question from a questioner. As illustrated in FIG. 7A, the question reception image 31 illustrates an example in which the user A posts the question 1. Additionally, in the question reception image 31, an entry field 311 for entering a question, and a Send button 312 for transmitting the question content entered into the entry field 311 are displayed.

FIG. 7B is a question-and-answer image 32 in which a posted question and any answers to the question are displayed. Note that the question-and-answer image 32 in FIG. 7B illustrates a case in which the question has not yet been answered or rated. As illustrated in FIG. 7B, in the question-and-answer image 32, question content 321 asked by the questioner, an Answer button 322 that receives an answer to the question, a Rate Question button 323 that receives a rating of the question, a Rating Details button 324 for viewing the detailed content of rating(s) already given, and a score display 325 that indicates the score according to rating(s) already given to the question are displayed. The score display 325 according to the exemplary embodiment expresses the average of multiple scores as a number of stars going up to five stars.

FIG. 8A is an answer reception image 33 for providing an answer to a question. Note that the answer reception image 33 is displayed by pressing the Answer button 322 illustrated in FIG. 7B. As illustrated in FIG. 8B, the answer reception image 33 illustrates an example in which the user C provides an answer to the question 1. Additionally, in the answer reception image 33, question content 331 of the question 1 asked by the questioner, an entry field 332 for entering an answer to the question, and a Send button 333 for transmitting the answer content entered into the entry field are displayed.

FIG. 8B is a question rating image 34 for rating a question. Note that the question rating image 34 in FIG. 8B illustrates an example in which the user rates the question 1. Also, the question rating image 34 is displayed by pressing the Rate Question button 323 illustrated in FIG. 7B. As illustrated in FIG. 8B, in the question rating image 34, question content 341 asked by the questioner, a rating entry field 342 for entering a rating of the question, a comment entry field 343 for entering a rating comment for the question 1, and a Send button 344 for transmitting the entered content are displayed.

FIG. 9 is a question-and-answer image 32 in which a posted question and any answers to the question are displayed. Note that the question-and-answer image 32 in FIG. 9 illustrates a case in which the question has already been answered and rated.

As illustrated in FIG. 9, in the question-and-answer image 32 in which the question has already been answered and rated, the question content 321, the Answer button 322, the Rate Question button 323, the Rating Details button 324, and the score display 325 are displayed. Additionally, in the question-and-answer image 32, answer content 326 by one or more answerers in response to the question, a Rate Answer button 327 for receiving a rating with respect to each answer, a Rating Details button 328 for viewing the detailed content of rating(s) already given to each answer, and a score display 329 that indicates the score according to rating(s) already given to the answer. Note that in FIG. 9, the answer content 326, the Rate Answer button 327, the Rating Details button 328, and the score display 329 are displayed for each of the answer 1 and the answer 2.

Figure 10:
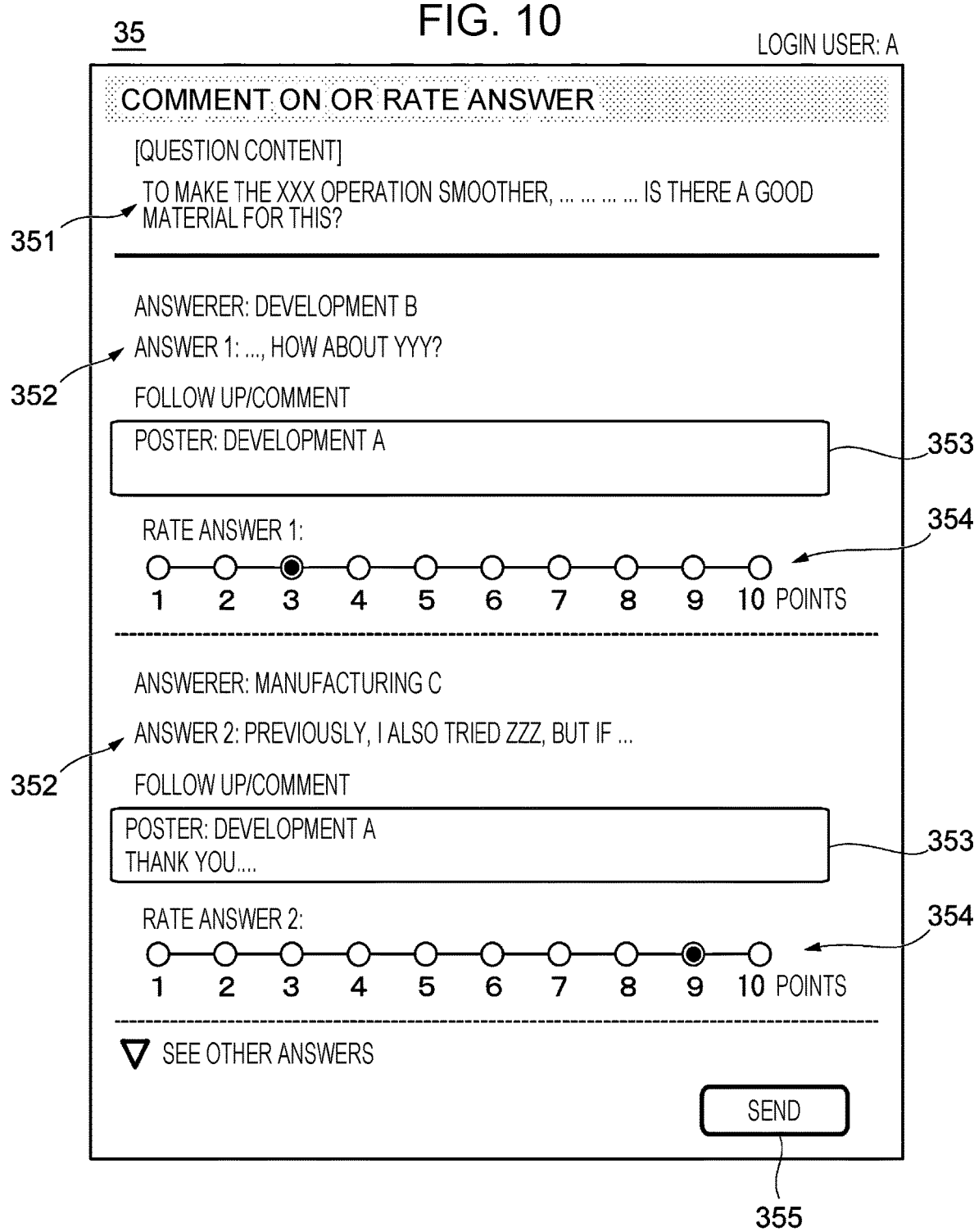
FIG. 10 is a questioner image by which a questioner comments on and rates answers.

FIG. 10 is a questioner image 35 by which a questioner comments on and rates answers. As illustrated in FIG. 10, the questioner image 35 illustrates an example in which the user A who is the questioner enters comments and ratings. Additionally, in the questioner image 35, question content 351 asked by the questioner, answer content 352 provided by each answerer, a comment entry field 353 by which the questioners enters a comment on each answer, a rating entry field 354 for entering a rating of each answer, and a Send button 355 for transmitting the entered content are displayed. Note that in FIG. 10, the answer content 352, the comment entry field 353, and the rating entry field 354 are displayed for each of the answer 1 and the answer 2.

FIG. 11 is an answer rating image 36 for rating an answer. Note that the answer rating image 36 in FIG. 11 illustrates an example in which the user D rates the answer 2. Also, the answer rating image 36 is displayed by pressing the Rate Answer button 327 illustrated in FIG. 9. As illustrated in FIG. 11, in the answer rating image 36, question content 361 asked by the questioner, answer content 362 provided by the answerer, a comment entry field 363 for entering a rating comment about the answer, a rating entry field 364 for entering a rating of the answer, and a Send button 365 for transmitting the entered content are displayed.

FIG. 12 is a rating details image 37 by which a viewer checks a rating of an answer. The rating details image 37 is displayed by pressing the Rating Details button 328 illustrated in FIG. 9. As illustrated in FIG. 12, in the rating details image 37, question content 371 asked by the questioner, answer content 372 provided by the answerer, a rating comment 373 by which a rater rated the answer 2, and a metarating button 374 for receiving a rating with respect to the rating of the answer are displayed.

FIG. 13 is a metarating image 38 for rating a rating of an answer. Note that the metarating image 38 in FIG. 13 illustrates an example in which the user E rates the rating of the answer 2. Also, the answer rating image 38 is displayed by pressing the metarating button 374 illustrated in FIG. 12. As illustrated in FIG. 13, in the metarating image 38, question content 381 asked by the questioner, answer content 382 provided by the answerer, rating content 383 with respect to the answer, a comment entry field 384 for entering a rating comment about the rating of the answer, a rating entry field 385 for entering a rating for the rating of the answer, and a Send button 386 for transmitting the entered content are displayed.

FIG. 14 is a rating request image 39 by which a requester requests rating information. Note that the rating request image 39 in FIG. 14 illustrates an example in which the user F acting as the requester requests rating information.

As illustrated in FIG. 14, the rating request image 39 includes a rating recipient specification field 391 for receiving attribute information for specifying one or more conditions on the rating recipient, a rater specification field 392 for receiving attribute information for specifying one or more conditions on the rater, a display specification field 393 for receiving a specification related to the display of the rating information, and a Create button 394 for receiving an instruction to create the rating information.

The rating recipient specification field 391 is configured to receive the specification of multiple attribute conditions. For example, the rating recipient specification field 391 receives a specification of whether the rating recipient is a questioner, an answerer, or a rater. Additionally, the rating recipient specification field 391 specifically receives attribute information about the rating recipient.

Also, the rater specification field 392 is configured to receive the specification of multiple attribute conditions. For example, the rater specification field 392 receives a specification of whether the rater is a questioner, an answerer, or a viewer. Additionally, the rater specification field 392 specifically receives attribute information about the rater.

In addition, the display specification field 393 receives a display condition regarding the display of the rating information. In other words, the display specification field 393 receives a specification about how to sort the rating results in the rating information when the rating information is presented to the requester. In the example of FIG. 14, the requester has specified that the rating results are to be sorted in order of highest rating in the rating information.

By pressing the Create button 394, the conditions specified in the rating recipient specification field 391, the rater specification field 392, and the display specification field 393 as above are transmitted to the server device 20.

Next, specific usage scenarios of the information processing system 1 according to the exemplary embodiment will be set up, and the rating information presented to the requester will be described specifically.

SPECIFIC EXAMPLE 1

FIG. 15 is an overview of a usage scenario of Specific Example 1. FIG. 16 is one example of rating information presented by the information presentation unit 24 in Specific Example 1.

As illustrated in FIG. 15, for example, in aaa Corp., a question-and-answer pair is formed in which the user A acts as the questioner and the user C acts as the answerer. In this case, the user A obtains useful information provided by the user C. On the other hand, the user C receives a rating by the user A. Additionally, in the usage scenario of the system in Specific Example 1, the exchange of questions and answers inside the organization is visualized. With this arrangement, in the system, activity by the users A and C that is difficult for a third party to grasp may be grasped. Additionally, for example, in aaa Corp., compensation for the activity by the user C, such as a bonus paid to the user C, may be determined. Furthermore, aaa Corp. obtains efficient labor through the proactive action of the user A proceeding with his or her duties while asking questions.

In the usage scenario of Specific Example 1, the case of performing personnel evaluation is anticipated. Note that in Specific Example 1, the requester who issues a request to the information presentation unit 24 (see FIG. 2) for the presentation of rating information is the user F in the personnel department, for example. The user F requests the presentation of rating information about multiple users in a group (in this example, aaa Corp.) to which the user F him- or herself belongs. In other words, a condition on the attribute information specified by the user F is the group name of the group to which the user F belongs (in this example, aaa Corp.). Also, in this example, the user F specifies the displays of the rating for the case where the rater and the rating recipient are in the same organization (in the present exemplary embodiment, division) and the rating for the case where the rater and the rating recipient are in different organizations.

Additionally, as illustrated in FIG. 16, in the rating information of Specific Example 1, for each user belonging to aaa Corp., the rating as a questioner, the rating as an answerer, and the rating as a rater are displayed. Note that in this example, the rating is displayed as the average of the scores. Furthermore, in the rating information of Specific Example 1, the score by raters in the same division as the rating recipient and the score by raters in a different division from the rating recipient are displayed separately.

Subsequently, by referencing the rating information of Specific Example 1, the user F is able to grasp the rating as a questioner, the rating as an answerer, and the rating as a rater for a user who belongs to the group of the user F.

For example, the user A has received relatively high ratings as a questioner. In this case, the user F is able to grasp that the user A is actively asking good questions. The user F is also able to grasp that there are many things the user A does not understand as the user A proceeds with his or her duties. Furthermore, the user F is able to determine that the leadership for guiding the user A is insufficient.

As another example, the user C has received relatively high ratings as an answerer. In this case, the user F is able to grasp that the user C has hidden talents, such as being skilled at solving problems, for example. Furthermore, the user F may consider assigning work duties suited to the user C or reallocating the user C. For example, the user D has received relatively high ratings as a rater. In this case, the user F is able to grasp that the user D has hidden talents, such as being skilled at judging the importance of issues raised inside the company.

Also, by referencing the rating information of Specific Example 1, the user F is able to grasp the circumstances of each user from the relationship between the rating by raters in the same organization (hereinafter, "inside the organization") as the organization (in this example, division) to which the user belongs and the rating by raters in a different organization (hereinafter, "outside the organization") from the organization to which the user belongs for each user.

For example, in the case where a questioner is highly rated by raters inside the organization, the user F is able to determine that the questioner is aware of the challenges inside the organization, and the allocation of the questioner to the organization is appropriate. On the other hand, in the case where a questioner is lowly rated by raters inside the organization, the user F is able to determine that the questioner is dissatisfied with the organization to which he or she belongs. In the case where a questioner is highly rated by raters outside the organization, the user F is able to grasp that the questioner is raising a generalized issue. On the other hand, in the case where a questioner is lowly rated by raters outside the organization, the user F may determine that the questioner does not understand his or her work as seen from outside the organization, or consider the possibility that the questioner is raising an unknown issue.

As another example, in the case where an answerer is highly rated by raters inside the organization, the user F is able to determine that the answerer is skilled at problem-solving inside the organization and understands the principles of the organization. On the other hand, in the case where an answerer is lowly rated by raters inside the organization, the user F is able to determine that the answerer is not suited to the problem-solving activity inside the organization, or that the answerer has a strong individuality. Also, in the case where an answerer is highly rated by raters outside the organization, the user F is able to grasp that the answerer is capable of proposing general-purpose solutions. On the other hand, in the case where the answerer is lowly rated by raters outside the organization, the user F may consider that the answerer is lacking ability, or consider the possibility that the answerer is proposing an unknown solution.

As yet another example, in the case where a questioner or an answerer is highly rated by raters outside the organization, the user F is able to determine that the questioner or answerer is suited to a different organization than the organization to which he or she belongs. On the other hand, in the case where a questioner or an answerer is lowly rated by raters inside the organization, the user F is able to determine that the questioner or answerer is also not suited to a position outside the organization.

Note that in the description of the rating information in Specific Example 1, the units of organization are divisions within a company, but even if the units of organization are groups (such as companies, for example), the circumstances of users may be grasped similarly in units of groups on the basis of the rating information.

SPECIFIC EXAMPLE 2

Figure 17:
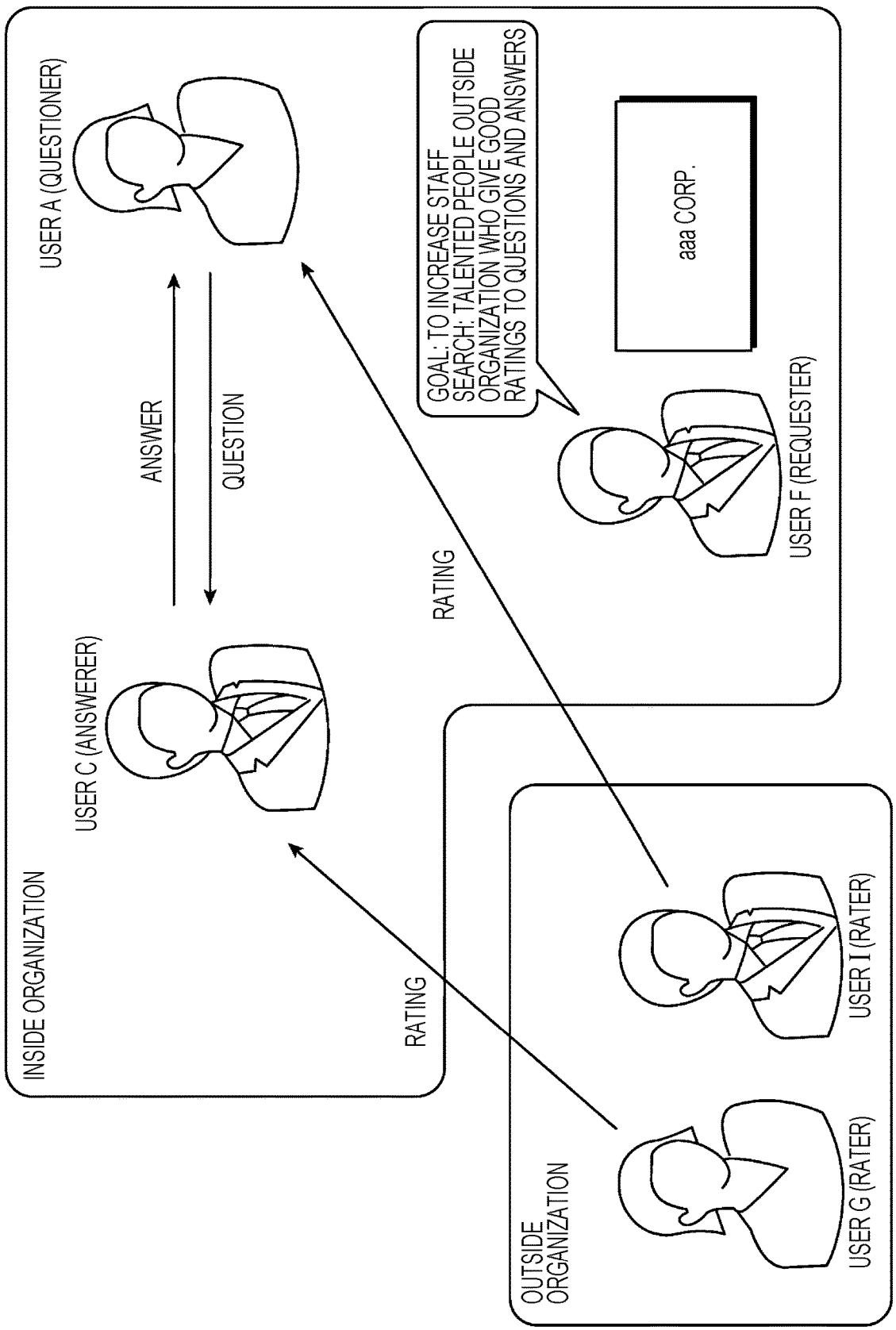
FIG. 17 is an overview of a usage scenario of Specific Example 2.

FIG. 17 is an overview of a usage scenario of Specific Example 2. FIG. 18 is one example of rating information presented by the information presentation unit 24 in Specific Example 2.

As illustrated in FIG. 17, for example, in aaa Corp., a question-and-answer pair is formed in which the user A acts as the questioner and the user C acts as the answerer. Also, in this example, questions and answers in aaa Corp. are also rated by raters belonging to a different organization than aaa Corp. (hereinafter, "outside the organization"). Additionally, in the usage scenario of Specific Example 2, a usage scenario when hiring new personnel in aaa Corp. from outside the company is anticipated. Note that in Specific Example 2, the requester who issues a request to the information presentation unit 24 for the presentation of rating information is the user F in the personnel department, for example.

Additionally, the condition on the attribute information that the user F specifies for specifying rating information from the relationship information is assumed to be that the rater who rates questions and answers inside the organization of the user F (in this example, aaa Corp.) is from outside the organization. In other words, the user F issues a request to the information presentation unit 24 for the presentation of rating information indicating the relationship between questions and answers inside the organization and ratings by raters outside the organization.

As illustrated in FIG. 18, in the rating information of Specific Example 2, an answer ID formed by a questioner and an answerer in aaa Corp., the user name of the rater outside the organization and the group name to which the rater belongs, the score given to the question by the rater, and the score given to the answer by the rater are displayed.

Subsequently, by referencing the rating information of Specific Example 2 illustrated in FIG. 18, the user F is able to grasp talent outside the organization who give high ratings to question-and-answer pairs in aaa Corp. For example, it is thought that a user outside the organization who gives high ratings to question-and-answer pairs inside the organization is able to raise issues inside the organization and share thoughts about potential solutions with users inside the organization. Accordingly, by grasping talent outside the organization who give high ratings to question-and-answer pairs in aaa Corp., it is possible to use the rating information to make hiring decisions about people outside the organization.

SPECIFIC EXAMPLE 3

Figure 19:
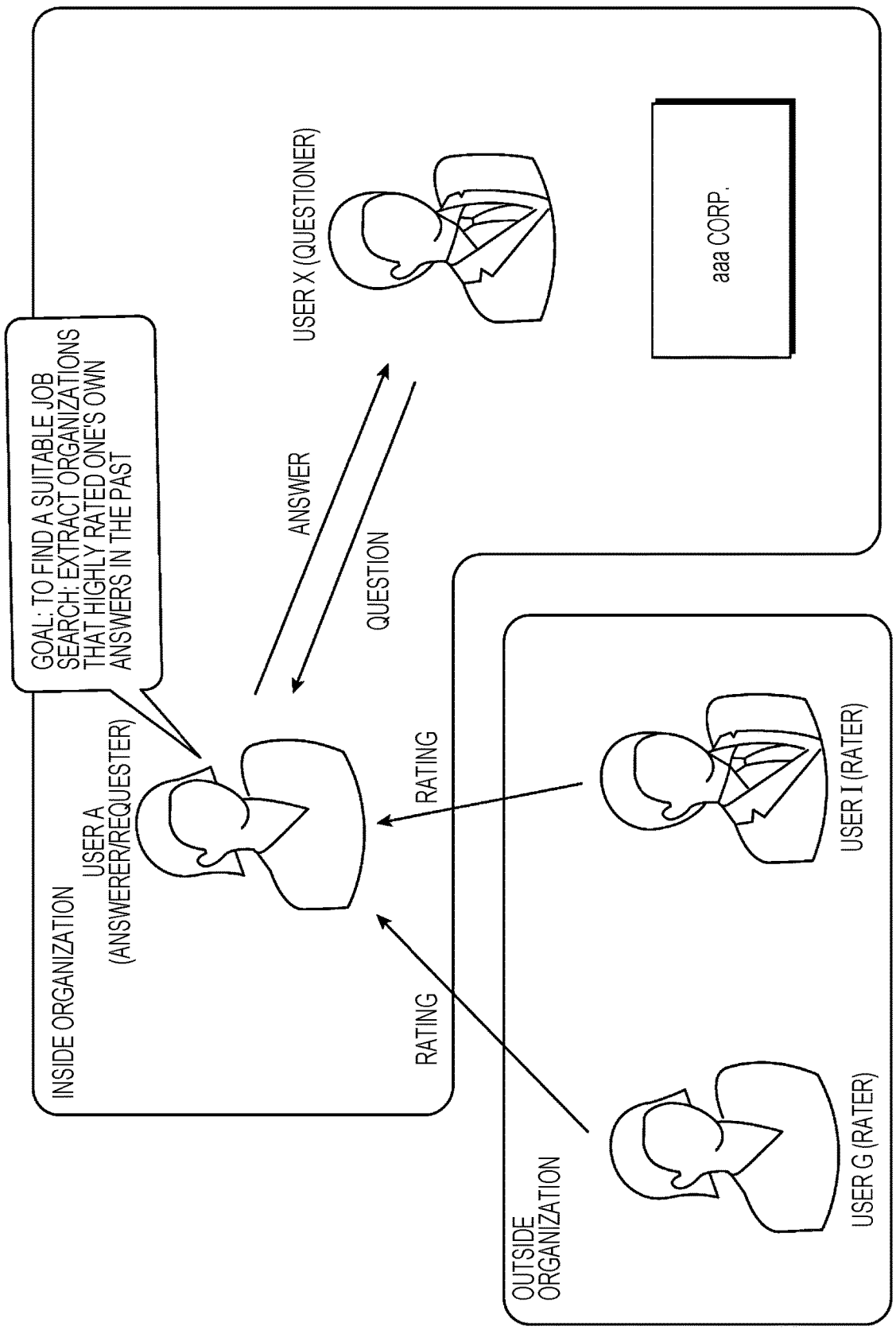
FIG. 19 is an overview of a usage scenario of Specific Example 3.

FIG. 19 is an overview of a usage scenario of Specific Example 3. FIG. 20 is one example of rating information presented by the information presentation unit 24 in Specific Example 3.

As illustrated in FIG. 19, for example, in aaa Corp., a question-and-answer pair is formed in which a user X acts as the questioner and the user A acts as the answerer. Also, in this example, the answer by the user A is also rated by raters belonging to a different organization than aaa Corp. (hereinafter, "outside the organization"). Additionally, in the usage scenario of Specific Example 3, the case in which the user A belonging to aaa Corp. is considering a change of career is anticipated. Note that in the usage scenario of Specific Example 3, the requester who issues a request to the information presentation unit 24 for the presentation of rating information is the user A.

The condition on the attribute information that the user A specifies for specifying rating information from the relationship information is assumed to be that the rater who rates the answerer, that is, the user A, is from outside the organization. In other words, the user A issues a request to the information presentation unit 24 for the presentation of rating information indicating the relationship between answers by the user A him- or herself and ratings of the answers by raters outside the organization.

As illustrated in FIG. 20, in the rating information of Specific Example 3, the answer ID for which the answerer is the user A, the group name to which the rater belongs, the group type of the group to which the rater belongs, and the score are displayed. Subsequently, by referencing the rating information of Specific Example 3 illustrated in FIG. 19, the user A is able to grasp the organizations of raters who have highly rated answers by the user A. For example, it is conceivable that the group containing a rater who has highly rated an answer by an answerer, or the group type (for example, industry) of the group, is highly likely to be an organization suited to the answerer. Accordingly, by grasping the organizations that have given high ratings to answers by the user A, the user A is able to use the rating information as a reference when considering a change of career.

SPECIFIC EXAMPLE 4

FIG. 21 is an overview of a usage scenario of Specific Example 4. FIG. 22 is one example of rating information presented by the information presentation unit 24 in Specific Example 4.

As illustrated in FIG. 21, for example, in aaa Corp. and bbb Inc., question-and-answer pairs are formed by questioners and answerers. Additionally, a case of job hunting by a user O who is a university student, for example, is anticipated. In Specific Example 4, the requester who issues a request to the information presentation unit 24 for the presentation of rating information is the user O.

Additionally, the condition on the attribute information that the user O specifies for specifying rating information from the relationship information is assumed to be that the group type of the questioner and the answerer is the office equipment industry. With this arrangement, the user O causes the information presentation unit 24 to present rating information indicating the relationship between question-and-answer pairs in the office equipment industry in which the user O wants to find a job and ratings by raters with respect to the question-and-answer pairs.

As illustrated in FIG. 22, in the rating information of Specific Example 4, for each answer ID, questioners and answerers whose group type is "office equipment manufacturer", the question content, and the answer content are displayed. Also, in this example, the answer IDs are sorted in order of the highest scores of the question and answer.

Subsequently, by referencing the rating information of Specific Example 4 illustrated in FIG. 22, the user O is able to grasp highly rated questions and answers in the office equipment industry.

SPECIFIC EXAMPLE 5

Figure 23:
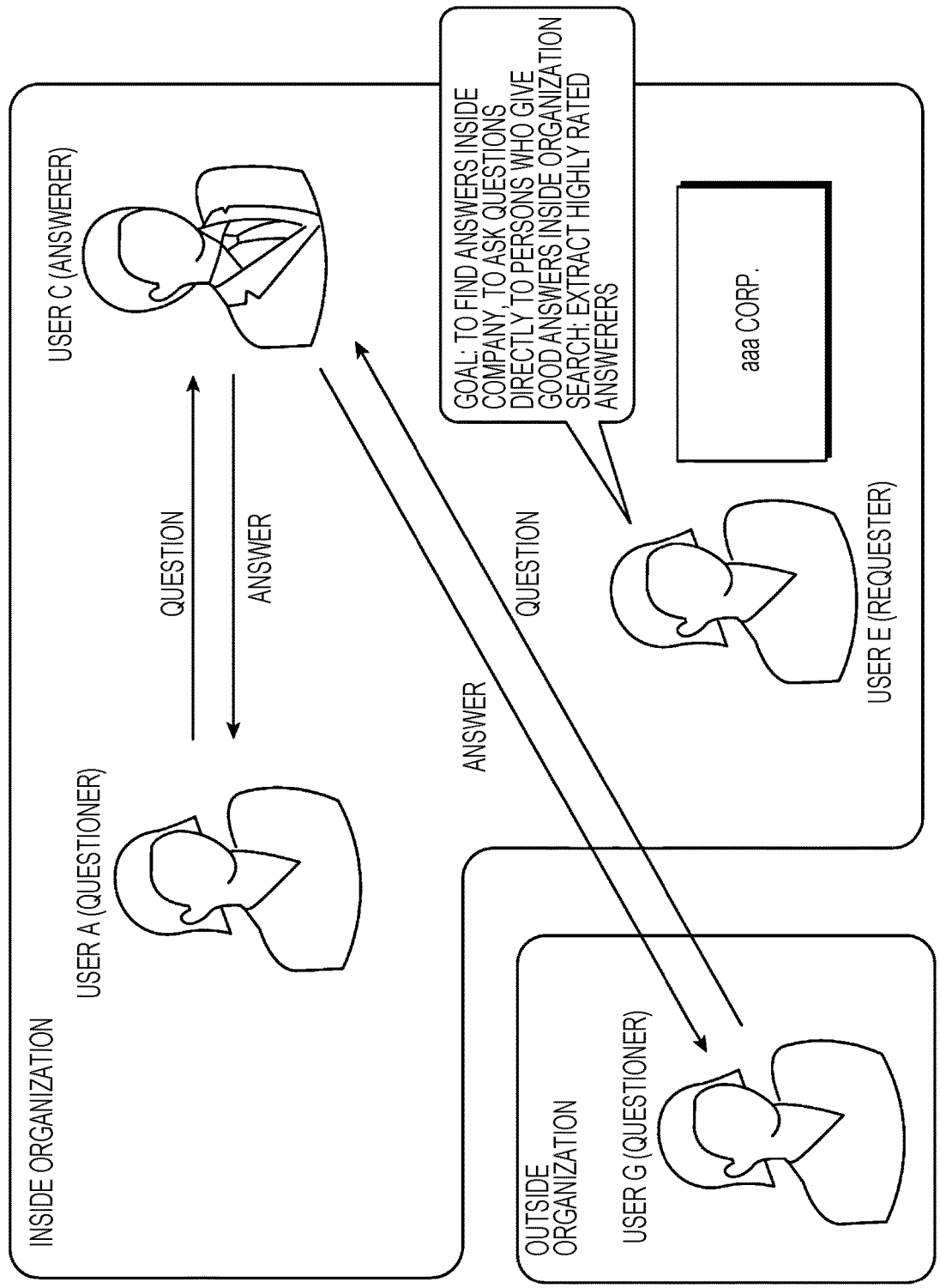
FIG. 23 is an overview of a usage scenario of Specific Example 5.

FIG. 23 is an overview of a usage scenario of Specific Example 5. FIG. 24 is one example of rating information presented by the information presentation unit 24 in Specific Example 5.

As illustrated in FIG. 23, for example, question-and-answer pairs are formed by the user C of aaa Corp. answering questions asked by questioners inside and outside the organization. Additionally, in Specific Example 5, the case in which the user E who belongs to aaa Corp. for example wants to ask questions directly to an answerer inside the same organization is anticipated. In other words, in Specific Example 5, the requester who issues a request to the information presentation unit 24 for the presentation of rating information is the user E.

A condition on the attribute information specified by the user E for specifying rating information from the relationship information is assumed to be the group name of the group to which the user E belongs (in this example, aaa Corp.).

As illustrated in FIG. 24, in the rating information of Specific Example 5, for each answer ID, the group name, the answerer, the rating of the answer, and the answer content are displayed. Also, in this example, the answer IDs are sorted in order from high to low score for the answer. In other words, in the rating information of Specific Example 5, rating recipients who belong to aaa Corp. to which the user E also belongs are prioritized for display. Also, along with the above, in the rating information of Specific Example 5, answers given by answerers who belong to aaa Corp. to which the user E also belongs are displayed in order of from high to low rating.

Additionally, by referencing the rating information of Specific Example 5 illustrated in FIG. 24, the user E is able to grasp answerers who are providing highly rated answers in aaa Corp. The user E is also able to check the answer content of raters who give high ratings. With this arrangement, for example, the user E is able to ask questions directly to highly rated answerers.

<Hardware Configuration of Each Device>

Figure 25:
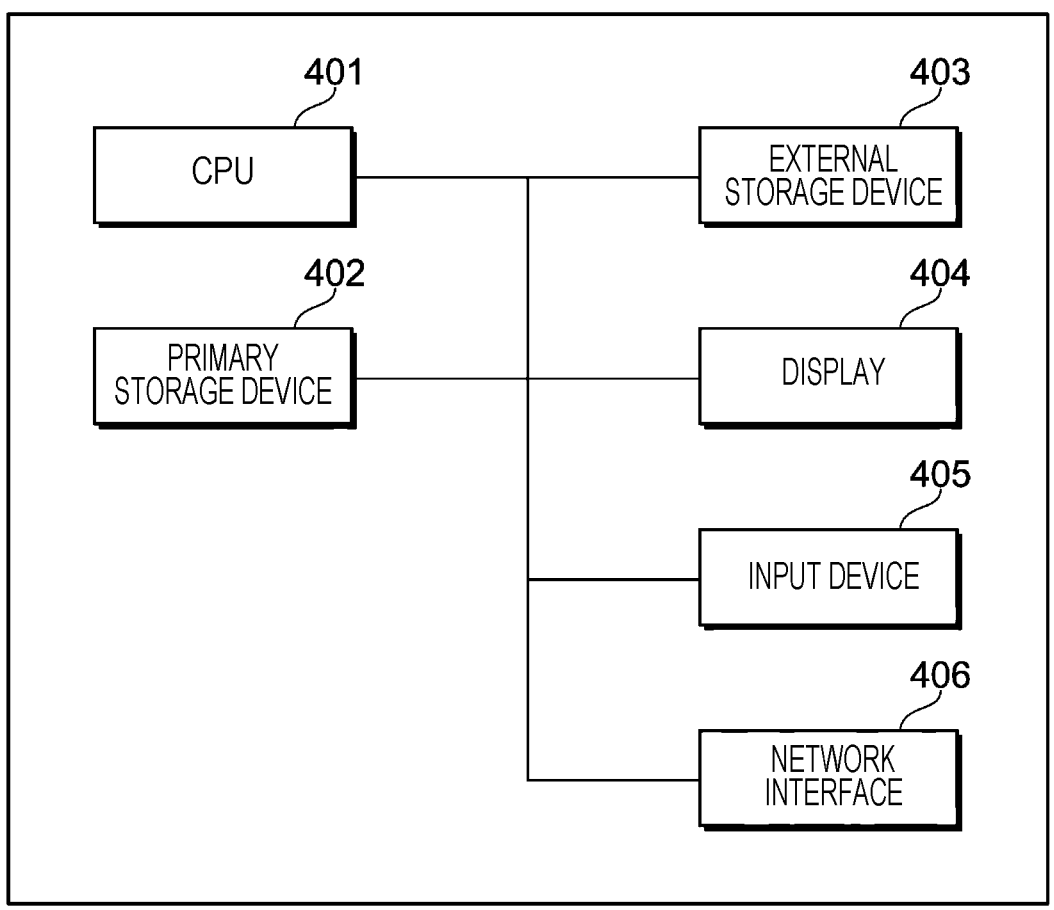
FIG. 25 is a diagram illustrating an exemplary hardware configuration of a computer that realizes a terminal device and a server device.

FIG. 25 is a diagram illustrating an exemplary hardware configuration of a computer that realizes the terminal device and the server device 20. A computer illustrated in FIG. 25 is provided with a central processing unit (CPU) 401 that acts as a computational component, and a primary storage device (main memory) 402 and an external storage device 403 that act as storage components. The CPU 401 loads a program stored in the external storage device 403 into the primary storage device 402, and executes the program. For the primary storage device 402, random access memory (RAM) is used, for example. For the external storage device 403, a device such as a magnetic disk drive or a solid-state drive (SSD) is used, for example. Also, the computer is provided with a display 404 that displays images, and an input device 405, such as a keyboard and mouse for example, that accepts input operations performed by an operator of the computer. The computer is also provided with a network interface 406 for connecting to a network.

The configuration of the computer illustrated in FIG. 25 is merely one example, and the configuration is not limited to the exemplary configuration in FIG. 25. For example, a configuration provided with non-volatile memory such as flash memory and read-only memory (ROM) as storage devices is also possible. Furthermore, the specific configuration may be different in some cases depending on the application target, such as the terminal device 10 or the server device 20. For example, each of the terminal device 10 and the server device 20 may be configured as a single computer, or may be realized by distributed processing by multiple computers. Also, the functions of the server device 20 are not limited to being realized entirely by the server device 20. For example, some or all of the functions of the server device 20 may also be executed by the terminal device 10.

Note that a program that causes the series of operations in the information processing system 1 according to the exemplary embodiment to be realized in the terminal device 10 and the server device 20 obviously may be provided by a communication medium, for example, and may also be provided by being stored on any of various types of recording media.

The foregoing describes an exemplary embodiment of the present disclosure, but the technical scope of the present disclosure is not limited to the foregoing exemplary embodiment. Various modifications and substitutions that do not depart from the scope of the technical ideas in the present disclosure are also included in the present disclosure.

The foregoing description of the exemplary embodiment of the present disclosure has been provided for the purposes of illustration and description. It is not intended to be exhaustive or to limit the disclosure to the precise forms disclosed. Obviously, many modifications and variations will be apparent to practitioners skilled in the art. The embodiment was chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing system comprising:
a processor programmed to:
receive a question asked by a questioner, an answer provided by an answerer to the question, and a rating by a rater with respect to at least one of the question and the answer,
manage relationship information, the relationship information being related to the questioner, the answerer, and the rating by the rater,
acquire attribute information about each of the questioner, the answerer, and the rater, and
cause rating information to be displayed on a display screen based on the relationship information and in response to a condition specified by a requester with respect to the attribute information, wherein
the rating information caused to be displayed on the display screen includes a plurality of columns and a plurality of rows displaying the rating information relative to the relationship information and the condition specified by the requester, and
the processor is programmed to
adjust content of the rating information according to information about a time when the rating by the rater is received, and
set a first weight on the rating if the rating has a first increase in a rating value per unit time and set a second weight on the rating if the rating has a second increase in the rating value per unit time, the first weight being greater than the second weight, and the first increase being smaller than the second increase.

2. An information processing system comprising:
one or more processors programmed to:
receive a specification of attribute information about each of a questioner who asks a question, an answerer who provides an answer to the question, and a rater who gives a rating to at least one of the question and the answer, and
display, on a display screen, rating information specified by the attribute information, the rating information being based on relationship information of the questioner, the answerer, and the rating by the rater, wherein
the rating information displayed on the display screen includes a plurality of columns and a plurality of rows displaying the rating information relative to the relationship information and the condition specified by the requester, and
the one or more processors are further programmed to
adjust content of the rating information according to information about a time when the rating by the rater is received, and
set a first weight on the rating if the rating has a first increase in a rating value per unit time and set a second weight on the rating if the rating has a second increase in the rating value per unit time, the first weight being greater than the second weight, and the first increase being smaller than the second increase.

3. A non-transitory computer readable medium storing a program causing a computer to execute a process for processing information, the process comprising:
receiving a question asked by a questioner, an answer provided by an answerer to the question, and a rating by a rater with respect to at least one of the question and the answer;
managing relationship information, the relationship information being related to the questioner, the answerer, and the rating by the rater;
acquiring attribute information about each of the questioner, the answerer, and the rater; and
causing rating information to be displayed on a display screen based on the relationship information and in response to a condition specified by a requester with respect to the attribute information, wherein
the rating information caused to be displayed on the display screen includes a plurality of columns and a plurality of rows displaying the rating information relative to the relationship information and the condition specified by the requester, and
the process further comprises
adjusting content of the rating information according to information about a time when the rating by the rater is received, and
setting a first weight on the rating if the rating has a first increase in a rating value per unit time and set a second weight on the rating if the rating has a second increase in the rating value per unit time, the first weight being greater than the second weight, and the first increase being smaller than the second increase.

* * * * *